(12) United States Patent
Tsai

(10) Patent No.: US 6,356,662 B1
(45) Date of Patent: Mar. 12, 2002

(54) METHOD OF EFFICIENTLY HANDLING DIGITIZED DATA THROUGH COMPRESSION/DECOMPRESSION AND UTILIZATION

(75) Inventor: Rong-Chuan Tsai, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/260,905

(22) Filed: Mar. 2, 1999

(30) Foreign Application Priority Data

Oct. 15, 1998 (TW) .......................................... 87117110

(51) Int. Cl.$^7$ .............................. G06K 9/36; G06K 9/46
(52) U.S. Cl. ..................................... 382/234; 375/240.1
(58) Field of Search ................................ 382/232, 234; 348/384.1, 388.1, 389.1, 397.1; 375/240.1, 240.26; 386/112; 358/426

(56) References Cited

U.S. PATENT DOCUMENTS 5,488,433 A * 1/1996 Washino et al. ............ 386/112
6,025,882 A * 2/2000 Geshwind .............. 375/240.26

* cited by examiner

Primary Examiner—Timothy M. Johnson
(74) Attorney, Agent, or Firm—Jiawei Huang; J. C. Patents

(57) ABSTRACT

A data handling method is provided for handling digitized data through compression/decompression and utilization. By this method, the original digitized data are concurrently compressed into a first set of compressed data through a low-compression-rate compression process and a second set of compressed data through a high-compression-rate compression process. Then, the first and second sets of compressed data are transferred together to an information processing unit, such as a personal computer. At the personal computer, the first set of compressed data are decompressed to obtain a set of decompressed data representing the original digitized data for output of the original digitized data at an output device, while the second set of compressed data remain in compressed form for storage and further transfer. Since the information processing unit needs to perform just a simple decompression process to decompress the low-compression-rate set of compressed data, the overall system efficiency can be increased.

27 Claims, 1 Drawing Sheet

US 6,356,662 B1

METHOD OF EFFICIENTLY HANDLING DIGITIZED DATA THROUGH COMPRESSION/DECOMPRESSION AND UTILIZATION

CROSS-REFERENCE TO RELATED APPLICATION

This application claims the priority benefit of Taiwan application serial no. 87117110, filed Oct. 15, 1998, the fill disclosure of which is incorporated herein by reference.

BACKGROUND OF THE INVENTION

1. Field of the Invention

This invention relates to handling digitized data, and more particularly, to a method of handling digitized data, such as digitized video data, in a digital information system, such as a personal computer in conjunction with a digital camera, which allows the handling of the digitized data in the digital information system to be more efficiently carried out to help reduce the load on the CPU (central processing unit) of the computer.

2. Description of Related Art

The digital camera has recently become a popular peripheral device for personal computers (PC) due to breakthrough development in digital signal processing (DSP) technologies. To make the digital camera acceptable to the consumers, it must be cheap to purchase and easy to install and use. To achieve these objectives, most manufacturers use standard components to build their digital camera products. For instance, the data communication interface between the digital camera and the PC employs typically a standard data communication interface, such as ECP (Extended Capabilities Port), EPP (Enhanced Parallel Port), or USB (Universal Serial Bus).

Presently, an ECP/EPP interface can provide a data transmission rate of from 5 Mbps to 12 Mbps (megabits per second), while a full-speed USB interface can provide 12 Mbps. However, in the case of transmitting CIF (Common Interchanged Format) formatted video data at 30 frames per second, the required data rate is 352×288×2×8×30= 48.66048 Mbps. In order to transmit such a great amount of digitized video data over an ECP, EPP, or USB interface, the data should be compressed.

FIG. 1 is a schematic block diagram showing the system configuration of a digital camera used in conjunction with a PC. As shown, the digital camera includes a video unit 10 and a compression unit 20, with the compression unit 20 being coupled via a peripheral communication interface 50, such as an ECP, an EPP, or a USB interface, to a PC 30. The PC 30 is further coupled to a communication network line 60 and a data storage unit 40. The video unit 10 includes a video image sensor 11, a CDS/AGC (Correlation Duplex Sampling & Auto Gain Control) unit 12, an ADC (Analog to Digital Converter) unit 13, and a signal processor 14. The analog video signal captured by the video image sensor 11 is processed successively by the CDS/AGC unit 12, the ADC unit 13, and the signal processor 14 to obtain a set of digitized video data. The digitized video data output from the signal processor 14 are then compressed by the compression unit 20 through a compression process into compressed data of a specific video compression format, which can be either a proprietary video compression format or a standard video compression format such as MPEG, H.261, or H.263. A proprietary video compression format is typically low in compression ratio, whereas a standard video compression format is typically high in compression ratio.

In the case of using a proprietary video compression format, the compressed video data are transferred via the peripheral communication interface 50 to the PC 30. To allow the compressed video data to be displayed and edited, the PC 30 should first perform a decompression process on these data. This decompression process is the inverse of the compression process performed by the compression unit 20. The decompressed video data can be then displayed on the monitor screen (not shown) of the PC 30. Owing to the limitation of the storage capacity of the data storage unit or the limitation of a bandwith of the communication network line, the decompressed video data stored in the data storage unit 40 or transmitted over the communication network line 60 must be again compressed, typically into a high-compression-rate video compression format, such as MPEG, H.261, or H.263. The data storage unit 40 can be either a hard disk, a magnetic tape, a writable optical disc as a CD (compact disc) or DVD a (digital versatile disc), or a flash memory unit.

One drawback to the use of the low-compression-rate proprietary video compression format, however, is that the captured video data from the video unit 10 should undergo a compression-decompression-compression process before they are stored into the data storage unit 40 or transmitted over the communication network line 60, and therefore the subsequently decompressed data from the data storage unit 40 or the communication network line 60 is significantly poor in fidelity. Moreover, since the PC 30 needs to perform many decompression and compression steps, the load on the PC 30 is very heavy, making the overall system performance of the PC 30 low.

In the case of using a high-compression-rate video compression format such as MPEG, H2.261, or H.263, the compressed video data are transferred via the peripheral communication interface 50 to the PC 30. To allow the compressed video data to be displayed and edited, the PC 30 must first perform a decompression process on these data. This decompression process is the inverse of the previous compression process performed by the compression unit 20. The decompressed video data can be then displayed on the monitor screen (not shown) of the PC 30. One advantage of using high-compression-rate video compression format over low-compression-rate one is that the received data from the peripheral communication interface 50 can be directly stored into the data storage unit 40 or transmitted over the communication network line 60 without having to perform an additional compression as in the foregoing case. Therefore, the PC 30 needs to perform just one decompression process to make the received data displayable and editable. The load on the PC 30 is thus reduced. One drawback to the use of high-compression-rate video compression format, however, is that it typically requires a high-end CPU to allow satisfactory processing speed. Moreover, in application, in order to satisfy the limitation of the storage capacity of the data storage unit or the limitation of a bandwidth of the communication network line, the video data must be compressed by the compression unit 20 with a high-compression ratio. However, the performance of the decompressed video data becomes poor while being re-decompressed and being shown in the monitor of the personal computer.

SUMMARY OF THE INVENTION

It is therefore an objective of the present invention to provide a method for handling digitized data through compression/decompression and utilization in a more efficient manner than the prior art.

In accordance with the foregoing and other objectives of the present invention, a new method is provided for use in a digital information system to handle digitized data through compression/decompression and utilization.

When used to handle digitized video data, the method includes compressing the original digitized video data concurrently into a first set of compressed data through a first compression process and a second set of compressed data through a second compression process. The first compression process has a lower compression ratio than the second compression process. The first and second sets of compressed data via a data transmission interface are transferred to an information processing unit. The first set of compressed data is decompressed through a decompression process to obtain a set of decompressed data representing the original digitized video data for output of the original digitized video data at an output device. The second set of compressed data remains in compressed form for storage into a data storage unit and transmission over a communication network line.

Since the information processing unit needs to perform just a simple decompression process to decompress the low-compression-rate set of compressed data, the overall system efficiency can be increased.

In general, the method of the invention can be used to handle any kind of digitized data. In this case, the method is broadly defined as a method for handling digitized data through compression/decompression and utilization. The method of the invention includes a first step of compressing the original digitized data concurrently into a first set of compressed data through a first compression process and a second set of compressed data through a second compression process. The first compression process has a lower compression ratio than the second compression process. The first and second sets of compressed data are transferred to an information processing unit. The first set of compressed data is decompressed through a decompression process to obtain a set of decompressed data representing the original digitized data for output of the original digitized data to an output device. The second set of compressed data remains in compressed form for storage and further transfer.

The information processing unit needs to perform just a simple decompression process to decompress the low-compression-rate set of compressed data, the overall system efficiency can be increased.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
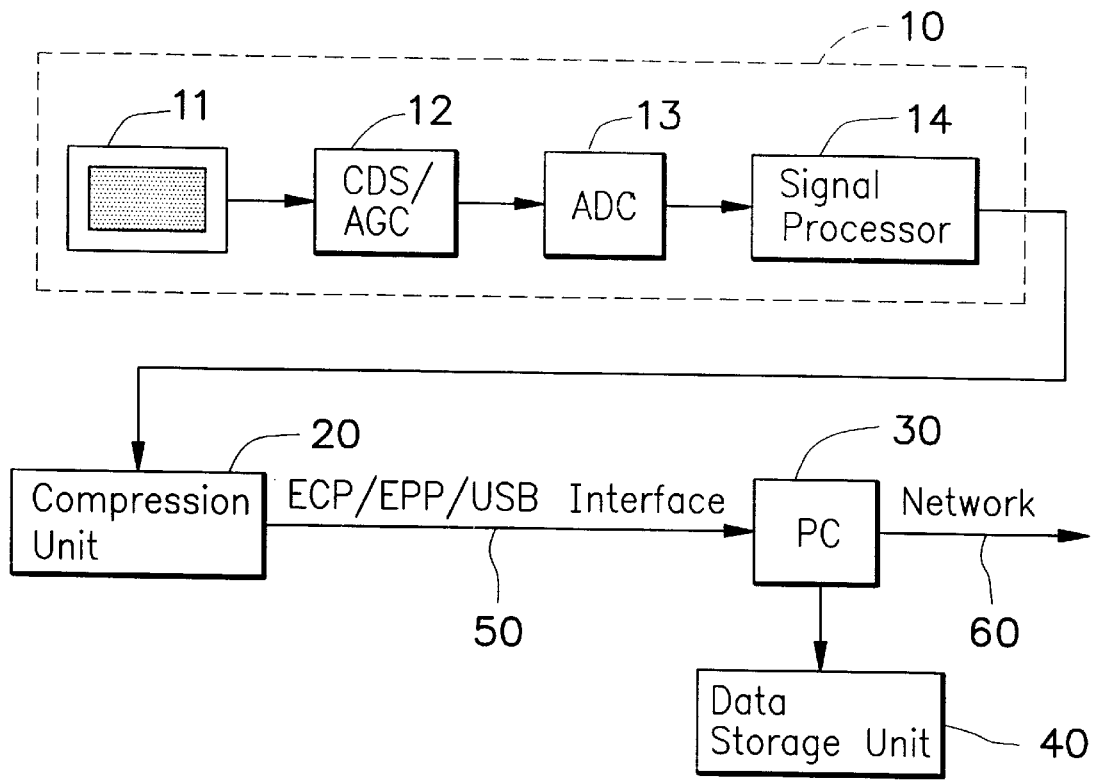
FIG. 1 is a schematic block diagram showing the system configuration of a digital camera used in conjunction with a PC.

In accordance with the invention, the digitized video data output from the video unit 10 shown in FIG. 1 are compressed through two separate compression processes, one with a low compression ratio and the other with a high compression ratio. The high-ratio compression process is based on a complex video compression format, such as MPEG, H.261 format, or H.263 format, which can compress the captured video data into low data amount for easy storage in a small-capacity data storage unit or transmission over a small-bandwidth communication network line. On the other hand, the low-ratio compression process is based on a simple video compression format, such as JBIG, JPEG or proprietary. These two sets of compressed data are then transferred together via the peripheral communication interface 50, such as ECP, EPP, or USB interface, to the PC 30.

The low-ratio set of compressed data are larger in compressed data amount than the high-ratio set, but are easier to decompress and higher in decompressed data fidelity. The low-ratio set of compressed data can be easily decompressed through a simple decompression process performed by the PC 30 and the decompressed video data are higher in fidelity to the originally captured video. Therefore, this set of compressed data are used for video display and editing.

At the PC 30, the high-ratio set of compressed data can be directly stored into the data storage unit 40 or transmitted over the communication network line 60 without having to perform a decompression process thereon. Therefore, this set of compressed data are used to make an archive or for transmission over the communication network line 60 to another site.

Presently, an ECP/EPP interface can provide a data transmission rate of from 5 Mbps to 12 Mbps (megabits per second), while a full-speed USB interface can provide 12 Mbps. Typically, the transmission of compressed data in high-compression-rate video compression format, such as MPEG, H.261, or H.263, requires a bandwidth of from 10 Kbps (Kilobits per second) to 3 Mbps. To allow the optimal frame rate and highest possible image fidelity, the compression unit 20 should be dynamically controlled to provide the optimal compression ratio.

The low-compression-rate set of compressed data and the high-compression-rate set of compressed data are transferred together via the peripheral communication interface 50 to the PC 30. To view the captured video, the PC 30 needs to perform just a decompression process on the low-compression-rate data set and then display the decompressed video data on its monitor screen (not shown). Since this low-compression-rate set of compressed data were originally compressed through a low-compression-rate compression process, the corresponding decompression process is simple and quick to perform, thus reducing the load on the CPU of the PC 30. Moreover, the displayed video from the decompressed video data is high in fidelity without much loss of details. To make an archive in the data storage unit 40 or transmit the captured video over the communication network line 60, the high-compression-rate set of compressed data are used, which can be stored directly into the data storage unit 40 or transmitted over the communication network line 60 without having to perform a further compression process. This also allows the load on the CPU of the PC 30 to be reduced, thus allowing the PC 30 to operate more efficiently.

The peripheral communication interface 50, beside ECP, EPP, or USB, can also be a UART (Universal Asynchronous Receiver/Transmitter), an IR (Infrared), or a PCI (Peripheral Component Interconnect) interface.

Figure 2:
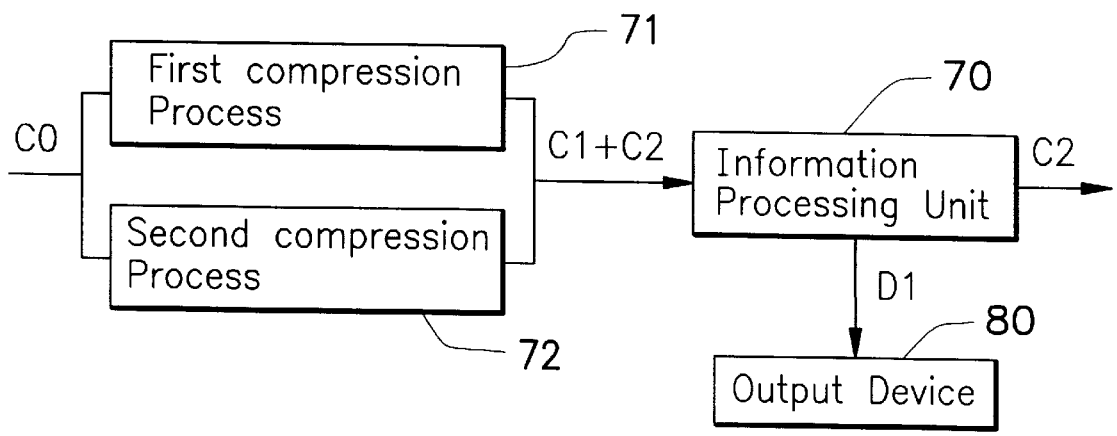
FIG. 2 is a schematic diagram showing the system configuration of the method of the invention for handling digital data through compression/decompression and utilization.

The foregoing preferred embodiment is directed to the handling of digitized video data through compression/decompression and utilization. However, the invention is not limited to such an application. Broadly speaking, the invention can be used to handle any kind of digitized data, which is depicted in the following with reference to FIG. 2.

As shown, when a set of original digitized data $C_0$ is received, they are converted by a first compression process 71 into a first set of compressed data $C_1$ and by a second compression process 72 into a second set of compressed data $C_2$, with the first compression process 71 performing a lower compression ratio than the second compression process 72. Then, the first and second sets of compressed data $C_1$, $C_2$ are transferred together to an information processing unit 70, such as a personal computer. At the information processing unit 70, the first set of compressed data $C_1$, which were previously compressed by a low-ratio compression process, are decompressed through a decompression process to obtain a set of decompressed data $D_1$ which closely represent the original digitized data $C_0$. The decompressed data $D_1$ are then transferred to an output device 80. The output device 80 can be a monitor screen for displaying the video contents of the decompressed data $D_1$ or a loudspeaker for broadcasting the audio contents of the same. Moreover, the second set of compressed data $C_2$ can be directly, i.e., without further decompression and compression, stored into a data storage unit (not shown) or transmitted over a communication network line (not shown) to another site.

In conclusion, the invention provides a method for handling digitized data through compression/decompression and utilization, which can compress the original digitized data concurrently into a first set of compressed data through a low-compression-rate compression process and a second set of compressed data through a high-compression-rate compression process, and then transfer the first and second sets of compressed data together to an information processing unit, in which the low-compression-rate set of compressed data are decompressed to obtain a set of decompressed data for output of the original digitized data at an output device, while the second set of compressed data remain in compressed form for transfer. Since the infornation processing unit needs to perform just a simple decompression process to decompress the low-compression-rate set of compressed data, the overall system efficiency can be increased.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for use in a digital information system to handle a set of original, digitized video data through compression/decompression and utilization, comprising the steps of:

concurrently compressing the original digitized video data into a first set of compressed data through a first compression process and a second set of compressed data through a second compression process, with the first compression process having a lower compression ratio than the second compression process; and transferring the first and second sets of compressed data via a data transmission interface to an information processing unit, in which the first set of compressed data are decompressed through a decompression process to obtain a set of decompressed data representing the original digitized video data for output of the original digitized video data at an output device, while the second set of compressed data remain in compressed form for storage into a data storage unit and transmission over a communication network line.

2. The method of claim 1, wherein the first compression process is based on a proprietary video compression format.

3. The method of claim 1, wherein the first compression process is in compliance with the JBIG standard.

4. The method of claim 1, wherein the first compression process is in compliance with the JPEG standard.

5. The method of claim 1, wherein the second compression process is in compliance with the MPEG standard.

6. The method of claim 1, wherein the second compression process is in compliance with the H.261 standard.

7. The method of claim 1, wherein the second compression process is in compliance with the H.263 standard.

8. The method of claim 1, wherein the data transmission interface is an ECP-compliant interface.

9. The method of claim 1, wherein the data transmission interface is an EPP-compliant interface.

10. The method of claim 1, wherein the data transmission interface is a USB-compliant interface.

11. The method of claim 1, wherein the data transmission interface is a UART-compliant interface.

12. The method of claim 1, wherein the data transmission interface is an IR-compliant interface.

13. The method of claim 1, wherein the data transmission interface is a PCI-compliant interface.

14. The method of claim 1, wherein the data storage unit is a hard disk.

15. The method of claim 1, wherein the data storage unit is a magnetic tape.

16. The method of claim 1, wherein the data storage unit is a CD.

17. The method of claim 1, wherein the data storage unit is DVD.

18. The method of claim 1, wherein the data storage unit is a flash memory unit.

19. A method for use in a digital information system to handle a set of original, digitized data through compression/decompression and utilization, comprising the steps of:

compressing the original digitized data concurrently into a first set of compressed data through a first compression process and a second set of compressed data through a second compression process, with the first compression process having a lower compression ratio than the second compression process; and transferring the first and second sets of compressed data to an information processing unit, in which the first set of compressed data are decompressed through a decompression process to obtain a set of decompressed data representing the original digitized data for output of the original digitized data at an output device, while the second set of compressed data remain in compressed form for storage and further transfer.

20. The method of claim 19, wherein the second set of compressed data are transferred to a data storage unit for storage.

21. The method of claim 19, wherein the second set of compressed data are transferred over a communication network line.

22. The method of claim 19, wherein the second decompression process is a MPEG-compliant decompression process.

23. The method of claim 19, wherein the second decompression process is a H.261 format decompression process.

24. The method of claim 19, wherein the second decompression process is a H.263 format decompression process.

25. The method of claim 19, wherein the information processing unit is an IBM-compatible PC.

26. The method of claim 19, wherein the output device is a monitor screen.

27. The method of claim 19, wherein the output device is a loudspeaker.

* * * * *